(12) United States Patent
Kintzele et al.

(10) Patent No.: US 7,204,468 B2
(45) Date of Patent: Apr. 17, 2007

(54) ELASTIC ARTICLE SUSPENSION DEVICE FOR AN INFANT

(76) Inventors: Gregory Kintzele, 2732 E. Eldorado Pl., Denver, CO (US) 80210; Lisen Kintzele, 2732 E. Eldorado Pl., Denver, CO (US) 80210

( * ) Notice: Subject to any disclaimer, the term of this patent is extended or adjusted under 35 U.S.C. 154(b) by 513 days.

(21) Appl. No.: 10/670,623

(22) Filed: Sep. 25, 2003

(65) Prior Publication Data

US 2005/0067549 A1    Mar. 31, 2005

(51) Int. Cl.
A47G 29/00    (2006.01)
A47D 15/00    (2006.01)

(52) U.S. Cl. .................. 248/690; 248/102; 248/328; 248/693; D24/199

(58) Field of Classification Search ........... 248/690, 248/693, 102, 317, 323, 328; D24/199
See application file for complete search history.

(56) References Cited

U.S. PATENT DOCUMENTS

| | | | |
|---|---|---|---|
| 2,330,538 A | 9/1943 | Allen | |
| 2,490,230 A | 12/1949 | Riegel | |
| 2,628,666 A | 2/1953 | Hall | |
| 2,762,161 A | 9/1956 | Danielson | |
| 2,815,909 A * | 12/1957 | Paprocki et al. | 248/102 |
| 2,819,923 A * | 1/1958 | Anderson | 294/74 |
| 2,994,300 A * | 8/1961 | Grahling | 119/770 |
| 3,014,307 A | 12/1961 | Dupuis | |
| 3,039,159 A | 6/1962 | Burke | |
| 3,392,729 A * | 7/1968 | Lenoir | 606/234 |
| 3,866,649 A | 2/1975 | Bringmann | |
| 4,095,316 A * | 6/1978 | Gabriel | 24/599.1 |
| 4,159,792 A * | 7/1979 | Siegal | 224/267 |
| 4,253,544 A * | 3/1981 | Dalmaso | 182/3 |
| 4,416,438 A * | 11/1983 | King | 248/102 |
| 4,529,240 A | 7/1985 | Engel | |
| 4,745,883 A * | 5/1988 | Baggetta | 119/770 |
| 5,082,220 A * | 1/1992 | Pollock et al. | 248/104 |
| 5,505,161 A | 4/1996 | Swendseid | |
| 5,600,873 A * | 2/1997 | May | 24/3.2 |
| 5,613,657 A * | 3/1997 | Olaiz | 248/102 |
| 5,699,555 A * | 12/1997 | Schunter | 2/1 |
| 5,702,039 A | 12/1997 | Olaiz | |
| 6,000,591 A | 12/1999 | Alexander | |
| 6,029,870 A * | 2/2000 | Giacona, III | 224/148.6 |
| 6,216,319 B1 * | 4/2001 | Elkins | 24/3.2 |
| 6,250,526 B1 | 6/2001 | Bess | |
| 6,363,244 B1 * | 3/2002 | McGhee | 455/90.1 |
| 6,606,768 B2 * | 8/2003 | Henry et al. | 24/306 |
| 2002/0124297 A1 | 9/2002 | Caris | |

* cited by examiner

*Primary Examiner*—Anita M. King
(74) *Attorney, Agent, or Firm*—The Reilly Intellectual Property Law Firm, P.C.; John E. Reilly; Ellen Reilly

(57) ABSTRACT

An article suspension device for infants includes a length of cord having a continuous encircling member at one end for connection to a highchair or stroller or the like. An elastic loop is attached at the second end of the cord including an adjustable sleeve which allows for adjustment of the length of the elastic cord as well as adjustment of the elastic loop. The device further includes a fabric covering in outer surrounding relation to the cord.

16 Claims, 1 Drawing Sheet

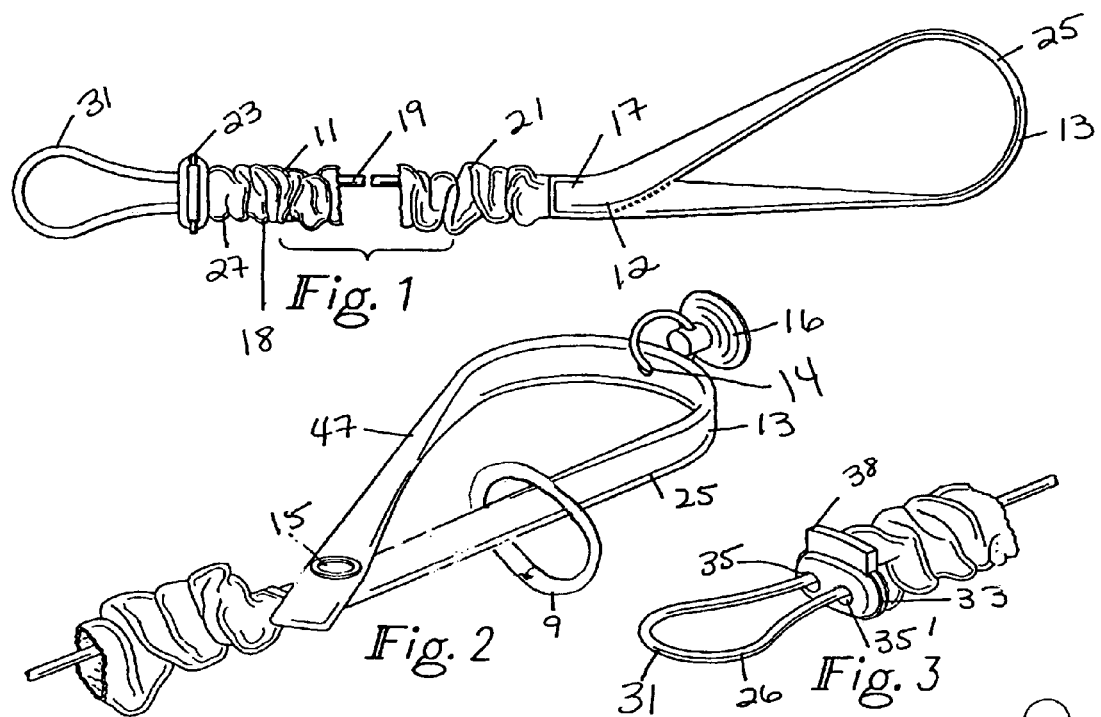
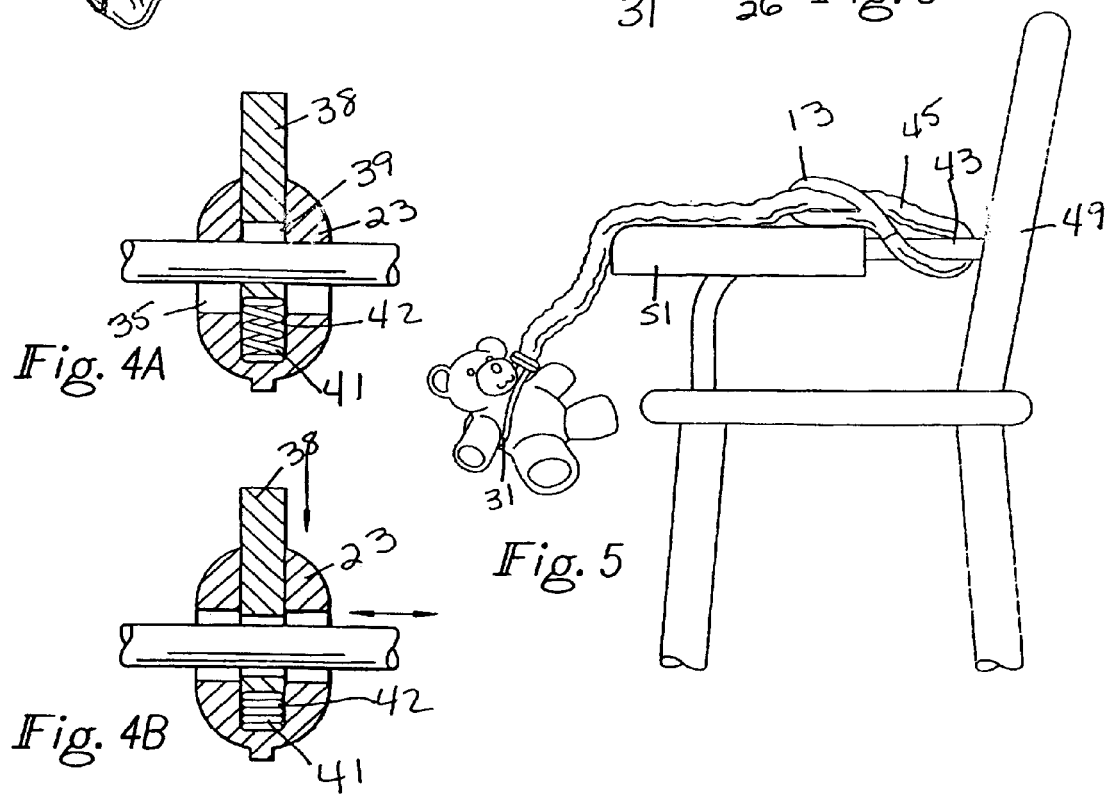

ELASTIC ARTICLE SUSPENSION DEVICE FOR AN INFANT

FIELD OF INVENTION

The present invention relates to an elastic article suspension device for an infant and in particular to a device that prevents toys and other articles from touching the ground when restrained in the device and enables easy retrieval of the object.

It is a well-known fact that when infants are seated in a highchair or stroller and offered toys to play with, or a bottle to drink, at some point they will generally knock or throw the toys or objects over the side of the highchair or stroller, allowing the toy or object to land on the floor or ground.

Oftentimes the ground is dirty, forcing the parent to constantly clean the article so that if the infant places it in his or her mouth they don't run the risk of picking up germs from the ground. Also, a child's favorite game is to throw objects over the side of the highchair necessitating repeated retrievals of the object from the ground.

Therefore, there continues to be a need for a device that is adapted to be suspended from a highchair or table and which will securely hold toys and allow them to be suspended from the highchair enabling a third party or the child to retrieve the object. Further, since infants will generally put anything within reach into their mouths, there is also a need for a device with a covering for ease of cleaning.

SUMMARY OF THE INVENTION

It is an object of the present invention to provide for a novel and improved suspension device which is easily attached around the arm of a highchair or the like.

It is another object of the present invention to provide for a novel and improved device which is easily transportable.

It is another object of the present invention to provide for an elastic suspension device that has a protective cover that is easily washed.

It is another object of the present invention to provide for a novel and improved device that helps in developing the motor skills of an infant.

It is a further object of the present invention to provide for a novel and improved that prevents toys from touching a dirty, unwashed floor.

It is a final object of the present invention to provide for a novel and improved device that allows easy retrieval of an object.

In accordance with the present invention, there is provided an article suspension device with encircling means for surrounding an object, an elastic loop and a length of cord having a first end secured to the elastic loop and a second end secured to the encircling means.

The present invention further includes a method of retrieving a toy or object. The method comprises positioning a toy within an adjustable loop of an elastic article suspension device, attaching the adjustable loop to a first end of the length of elastic material having an encircling member attached to a second end of the elastic material and detachably securing the encircling member to a fixed or stationary object.

There has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a front view of an elastic article suspension device in accordance with the present invention;

FIG. 2 illustrates a perspective view, partially in section, of the encircling portion of the present invention;

FIG. 3 illustrates an enlarged side view, in elevation, of the adjustable loop of the present invention;

FIG. 4A illustrates in a partial sectional view the adjusting member in a non-compressed position of the present invention;

FIG. 4B illustrates a partial sectional view of the adjusting member in the compressed position of the present invention; and FIG. 5 illustrates the suspension device of FIG. 1 in use.

DETAILED DESCRIPTION OF PREFERRED EMBODIMENT

Referring to FIG. 1, an article suspension device 11 has a suspension member 21 forming a continuous encircling loop 13 at a first end 25 and an adjustable loop 31 secured at the opposite end 27. The suspension member 21 includes a length of cord or elastic 19 that is adapted to extend over the edge of a highchair 49 or stroller. The encircling loop 13 may be formed of a length of cotton material but may also be formed of nylon webbing or any other type of material capable of being fastened or releasably secured together. A circular loop is formed by permanently securing, releasably fastening, buttoning or otherwise attaching a free end portion 12 to a base portion 17. An alternate embodiment of a releasable handle as shown in FIG. 2 includes fastener 15 and may include a snap fastener, VELCRO®, a button or any other type of releasable fastening. The encircling loop 13 may also include an eyelet opening member 14 which allows for attachment of a suction device 16 as shown in FIG. 2. Alternative fastening means, such as a suction device 16 may be utilized for securing the suspension device to a highchair, stroller or table top. For example, as shown in FIG. 2, end portion 25 may be attached to a plastic suction cup 16 which is capable of adhering to most surfaces through the use of suction. A carabiner 9 or similar type of encircling connector could also be substituted or attached to the encircling loop 13, as shown in FIG. 2.

The adjustable loop 31 is formed by placing a free end 26 of the cord 19 through the receiving openings 35 and 39, forming a loop and then placing the free end 26 of the cord 19 through The base portion 17 is attached to the suspension member 21 which includes a length of cord or elastic 19 which can be covered with a cotton fabric cover 18 or waterproof fabric to provide for easy cleaning of the device. The covering 18 also prevents or limits the cord 19 from stretching beyond a certain desired point or predetermined length if heavier objects are attached to the adjustable loop 31. Attached at end 27 is an adjustable loop 31 which is formed as a continuation of the cord 19. The adjustable loop 31 is inserted through an adjustable clamping device 23 which has a body member 33 as shown in FIG. 3 having dual material-receiving openings 35, 35' extending along a parallel axis with one another on opposite sides of the clamping device 23. Each pair of aligned openings 35, 35' are designed to receive a length of the cord 19 for adjusting the circumference of the adjustable loop 31, and the adjustable clamping device 23 has a slidable gate 38 normally urged to a closed position by a spring member 41 in a slot 42 within the clamping device 23 as illustrated in FIGS. 3, 4A and 4B. The gate 38 has opening 39 normally offset from the openings 35, 35' in the open position to engage a length of the cord 19. By manually depressing the gate 38, the opening 39 moves into alignment with the openings 35, 35' thereby allowing for free passage of the cord 19.

The adjustable loop 31 is formed by placing a free end 26 of the cord 19 through the receiving openings 35 and 39, forming a loop and then placing the free end 26 of the cord 19 through the opposing receiving holes 35' and 39 where it is secured with a knot or clip so that the loop 31 is capable of being adjusted for holding a toy, baby bottle or any other similar type object. The suspension line 21 may also be adjustable in length. If a shorter length is required, a length of the cord 19 may be encircled around the arm of a highchair, shortening the length of the suspension line 21.

FIG. 5 illustrates suspension device 11 in use, the encircling loop 13 serving as a carrying strap or handle which may then be encircled around an arm of a chair 43 or any other similar type opening on a highchair or stroller. Prior to attaching an article to the adjustable loop 31, the encircling loop 13 is wrapped partially around the arm of a chair 43 or highchair. The adjustable loop 31 is threaded through encircling loop 13 forming an encircling member 45 around the arm 43 of a highchair 49.

In an alternate embodiment, as shown in FIG. 2, the encircling loop 13 may be comprised of a length of a flexible strap 47 with a fastening device at one end 15. The encircling loop 13 may then be wrapped around the arm 43 of a highchair 49 and releasably fastened at one end.

The adjustable loop 31 extending from the suspension line 21 is positioned around a toy, baby bottle, sippy cup or any other similar type article. The adjustable loop 31 may be tightened through use of the adjusting device 23. The user simply places a thumb or forefinger on the slidable gate 38 and, while applying pressure, forces the slidable gate 38 to move in a similar direction to the spring 41, causing release of the material contained within the receiving slots 35, 35' of the body member 33. See FIG. 4B.

Once the adjustable loop 31 is positioned securely around a toy or other object and the encircling loop is attached around the arm of a chair 43, the infant may play with the toy and throw it over the side of the chair 49. The suspension device 11 is designed to securely hold toys or other objects in such a manner that the toys or objects are not continuously being thrown onto the ground. As long as the length of the suspension line 21 is adjusted correctly, the toy or object will not touch the ground, but will be suspended from the highchair 49. The infant may then pull the suspension line 21 for easy retrieval of the object, thereby contributing to the development of the infant's motor skills or the object can simply be retrieved by a third party and placed back on the tray table 51 of the highchair 49.

It is therefore to be understood that while several forms of invention are herein set forth and described, the above and other modifications may be made therein without departing from the spirit and scope of the invention as defined by the appended claims and reasonable equivalents thereof.

We claim:

1. An article suspension device for infants, comprising:
   encircling means for surrounding an object;
   an adjustable elastic loop;
   a single length of cord having a first end secured to said elastic loop and a second end secured to said encircling means; and
   said cord includes a cover extending between said first end and said second end of said cord in outer surrounding relation to said cord, said cover being stretchable a predetermined distance between a retracted position and an extended position in response to stretching of said cord.

2. A device according to claim 1 wherein said encircling means comprises a free end portion releasably secured to a base portion of said encircling means.

3. A device according to claim 2 wherein said free end portion is secured to said base portion with a snap fastener.

4. A device according to claim 1 wherein said encircling means comprises a carabiner.

5. A device according to claim 1 wherein said elastic loop is formed as a continuation of said cord.

6. A device according to claim 1 wherein said elastic loop includes means for adjusting a length of said loop and said cord.

7. A device according to claim 6 wherein said adjusting means is defined by a body member having a first material-receiving slot and a second material-receiving slot, said first material-receiving slot extending along a parallel axis with said second material receiving slot.

8. A device according to claim 7 wherein said adjusting means further includes a slidable gate normally urged to a closed position by a spring member.

9. A device according to claim 8 wherein a combination of said slidable gate in an open position and said spring form an unobstructed passage through which said length of cord may pass.

10. A device according to claim 1 wherein said cord includes elastic.

11. An article suspension device for infants, comprising:
    an adjustable elongated single elastic cord having means at a first end for encircling a stationary object;
    an elastic loop at a second end of said cord including a slidable member affixed to one end of said elastic loop and including means for releasably engaging said cord whereby to adjustably encircle an article inserted in said loop; and
    a flexible cover member extending between said first end and said second end in outer surrounding relation to said cord, said cover being stretchable a predetermined length between a retracted position and an extended position thereby limiting the extent of stretch of said cord.

12. A device according to claim 11 wherein said encircling means includes a securing member for detachably securing said cord to a stationary object.

13. A device according to claim 12 wherein said securing member includes a releasable handle.

14. A device according to claim 11 wherein said means for releasably engaging said cord includes a clamping member for securely engaging a length of said cord.

15. A device according to claim 11 wherein said means for releasably engaging said cord includes a body member with a single material-receiving opening at a first end and a slidable gate.

16. A device according to claim 11 wherein said cover member includes a fabric sleeve.

* * * * *